United States Patent [19]
Ma et al.

[11] Patent Number: 6,018,805
[45] Date of Patent: Jan. 25, 2000

[54] TRANSPARENT RECOVERY OF DISTRIBUTED-OBJECTS USING INTELLIGENT PROXIES

[75] Inventors: Henry Chi-To Ma, Redwood City; George C. Lo, Fremont, both of Calif.

[73] Assignee: Recipio, San Mateo, Calif.

[21] Appl. No.: 08/990,488

[22] Filed: Dec. 15, 1997

[51] Int. Cl.[7] .................................................. G06F 11/20
[52] U.S. Cl. ........................... 714/4; 714/10; 714/6; 714/15; 709/300; 709/303; 709/230
[58] Field of Search ............................... 714/4, 15, 6, 10; 709/230, 303, 300; 712/28; 380/21, 25; 707/202

[56] References Cited

U.S. PATENT DOCUMENTS

| | | | |
|---|---|---|---|
| 5,060,150 | 10/1991 | Simor ........................................ | 364/200 |
| 5,153,881 | 10/1992 | Bruckert et al. ........................... | 714/10 |
| 5,187,790 | 2/1993 | East et al. ................................. | 395/725 |
| 5,220,603 | 6/1993 | Parker ....................................... | 380/21 |
| 5,481,721 | 1/1996 | Serlet et al. .............................. | 395/700 |
| 5,511,197 | 4/1996 | Hill et al. ................................. | 395/700 |
| 5,513,314 | 4/1996 | Kandasamy et al. .............. | 395/182.04 |
| 5,517,668 | 5/1996 | Szwerinski et al. ..................... | 395/800 |
| 5,566,302 | 10/1996 | Khalidi et al. ........................... | 709/300 |
| 5,588,147 | 12/1996 | Neeman et al. ........................ | 395/601 |
| 5,594,863 | 1/1997 | Stiles ................................... | 395/182.13 |
| 5,603,031 | 2/1997 | White et al. ............................. | 395/700 |
| 5,613,148 | 3/1997 | Bezviner ................................. | 395/800 |
| 5,701,484 | 12/1997 | Artsy ....................................... | 709/303 |
| 5,764,897 | 10/1996 | Khalidi ..................................... | 709/201 |
| 5,862,312 | 1/1999 | Mann et al. ................................. | 714/6 |
| 5,892,946 | 4/1999 | Woster et al. ........................... | 709/300 |
| 5,903,725 | 5/1999 | Colyer ..................................... | 709/203 |

Primary Examiner—Robert W. Beausoliel, Jr.
Assistant Examiner—Wasseem H. Hamdan
Attorney, Agent, or Firm—Stuart T. Auvineu

[57] ABSTRACT

A distributed-object software application is capable of recovering from a server crash. The recovery is transparent to the client objects because the client objects do not have to be re-started or re-loaded. Proxies on the client machine handle the details of communication over the network with server objects. An intelligent proxy detects a server crash when no response is received from the server object. The intelligent proxy then sends a name identifier of the server object to a locator. The locator looks up the name identifier and returns a remote reference to another running instance of the server object. If no other running instance exists, the locator loads the server object onto another server machine. The intelligent proxy uses the remote reference from the locator to establish a connection with the new server machine and a session with the new server object. The intelligent proxy stored the last state of the server object before the crash. This last state is dumped to the new server object to advance the new server object to the last state of the crashed server object. Then the new server object is used to continue processing requests from the client object. The intelligent proxy hides the server crash from the client object so that the client object does not have to be reset. Proxies for folders and component levels of a hierarchical application are used to restore a hierarchy of server objects.

18 Claims, 10 Drawing Sheets

TRANSPARENT RECOVERY OF DISTRIBUTED-OBJECTS USING INTELLIGENT PROXIES

FIELD OF THE INVENTION

This invention relates to distributed-object software applications, and more particularly to error recovery for distributed applications.

BACKGROUND OF THE INVENTION

Explosive growth and widespread acceptance of computer networks has been a primary driver of productivity gains in the World economy. Many computer programs no longer operate on single, stand-alone computers. Instead, the software program itself is partitioned among one or more server machines and many clients.

Sophisticated distributed-computing models and software applications are becoming available. These applications use an object-oriented or component model, with larger applications being divided into small containers or "objects" of program code and data. The program objects are distributed to both the server and clients, with the details of network communication hidden from objects through the use of proxy and stub objects which transfer information over the network. Microsoft's Distributed Component Object Model (DCOM) and Object Management Group's Common Object Request Broker Architecture (CORBA) are two competing standards for distributed computing. A basic overview of distributed computing is given by Larry Seltzer in "Future Distributed Computing" and "PC Size, Mainframe Power", PC Magazine Mar. 25, 1997, pages 198–204.

Unfortunately, computer hardware and software still fail, perhaps leaving parts of the distributed program waiting for responses from remote objects on crashed servers. FIG. 1 illustrates a problem when a server crashes, leaving distributed client objects hanging.

A distributed application includes client object 10 running on a client machine, and server object 14 running on a server machine. Proxy 12 is a middleware object that facilitates communication between client object 10 and server object 14, effectively hiding much of the complexity of the network protocols and overhead.

When the server machine or its network connection crashes, client object 10 is no longer able to communicate with server object 14. A well-written client object 10 notices that an abnormally long period of time has elapsed with no response, and begins a re-start sequence. Client object 10 is shut down, and a new instance of the client object 10' is loaded and initialized. A new proxy 12' is also started. Another server is located, and a new instance of server object 14' is loaded on the new server and initialized.

Re-loading and initializing client object 10' and server object 14' has the undesirable side effect that the former state of client object 10 is lost. Client object 10 had already sequenced from initial state A through state B to state C when the server crashed. Server object 14 likewise had advanced from its initial state X to state Y. These states were lost when the objects were re-loaded. Client object 10' is initialized back to initial state A, and new server object 14' is initialized to its initial state X.

Users then have to repeat whatever steps they had previously performed, essentially losing some or all of their work. Users could have navigated several levels of forms and entered information that was lost. Server crashes are truly one of the great aggravations of the information age.

FIG. 2 highlights proxies used to communicate between client and server objects. A client object 10 communicates with a local object known as a proxy. Proxies 12 make a connection over the network to the server machine and create a session with server object 14. Thus proxies 12 contain connection and session information.

While proxies are effective at hiding the details and complexities of network communication from program objects, they do not hide server crashes from the client objects. When the server crashes, the proxies become invalid since proxies do not handle server crashes. Thus server crashes are not hidden from the client objects as are many other details of network communication.

What is desired is a distributed-object application that hides server crashes from client objects. It is desired to have proxies detect server failures and establish a session with a different server. It is desired to initialize the replacement server object to the last state of the crashed server object so that the client object can continue operation. It is desired to avoid resetting and re-loading client objects when a server crashes.

SUMMARY OF THE INVENTION

A transparently-recoverable distributed-object application has a client object running on a client machine on a network and a first server object on a first server machine on the network.

An intelligent proxy runs on the client machine. The client object communicates with the intelligent proxy when it sends a request over the network to a remote object. The intelligent proxy has a timeout means for determining when a request sent from the intelligent proxy to the first server object has not been responded to in a predetermined time.

A storage means stores a name-identifier for the first server object. A locator means is coupled to receive the name-identifier from the intelligent proxy. It generates a pointer to a second server object also identified by the name-identifier from the intelligent proxy. A new connection means receives the pointer from the locator means. It establishes a new connection between the intelligent proxy and a second server and establishes a new session with the second server object on the second server.

Thus the intelligent proxy establishes the new connection to the second server when the firsts server object does not respond. The new connection is transparent to the client object.

In further aspects of the invention the storage means in the intelligent proxy also stores a last state of the first server object. The new connection means includes state-sending means to send the last state stored in the intelligent proxy to the second server object. The second server object includes a state means for advancing in state to the last state received from the intelligent proxy. Thus the second server object is advanced to the last state of the first server object.

In still further aspects the storage means in the intelligent proxy further stores hierarchy information to indicate a hierarchy of objects in the distributed-object application that includes the first server object.

A folder proxy on the client machine communicates with a server folder of server objects on the first server machine. The folder proxy stores a folder name. The folder name is sent to the locator means, which returns a folder reference to a second folder on the second server. Thus the folder proxy is a proxy for a higher-level folder of server objects.

In still further aspects an application-component proxy on the client machine communicates with a server application-component on the first server machine. The application-component proxy stores an application-component name. The application-component name is sent to the locator means, which returns an application-component reference to a second application-component on the second server. Thus the application-component proxy is a proxy for a higher-level application-component has folders of server objects.

In still further aspects of the invention, the intelligent proxy for the first server object further stores a folder-proxy reference to the folder proxy. The folder proxy further itself stores a component-proxy reference to the application-component proxy. Thus a hierarchy of proxies stores hierarchy information for the first server object.

DETAILED DESCRIPTION

The present invention relates to an improvement in distributed-object programs. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
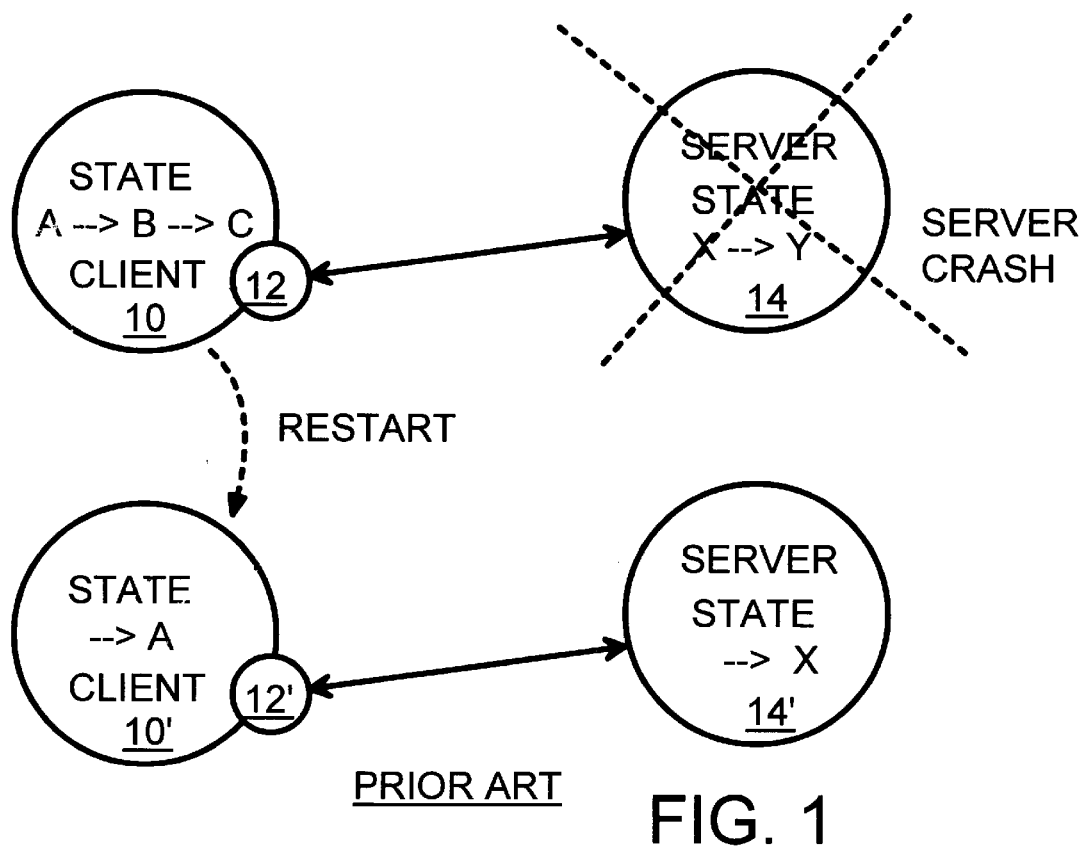
FIG. 1 illustrates a problem when a server crashes, leaving distributed client objects hanging.
Figure 2:
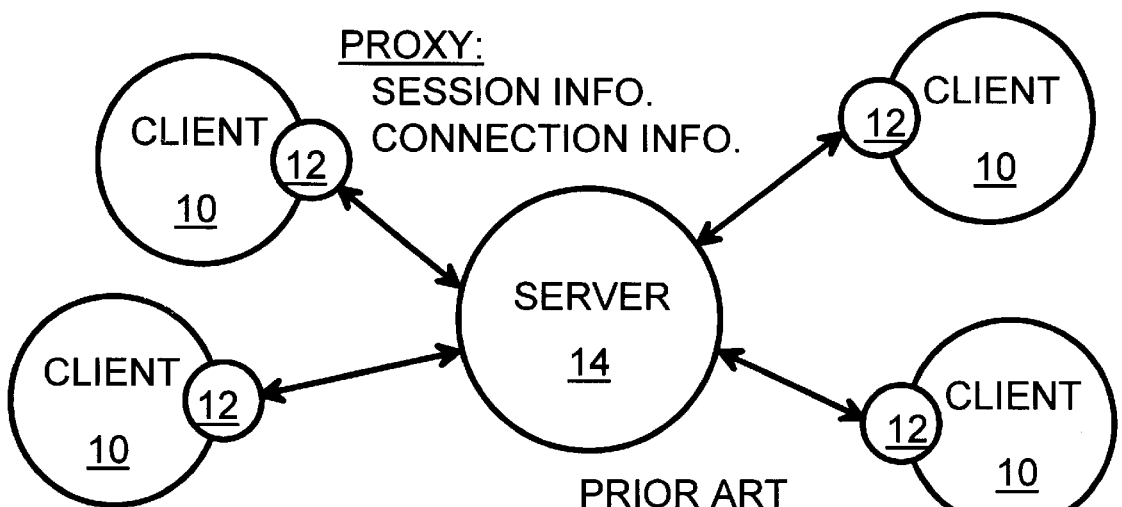
FIG. 2 highlights proxies used to communicate between client and server objects.
Figure 3:
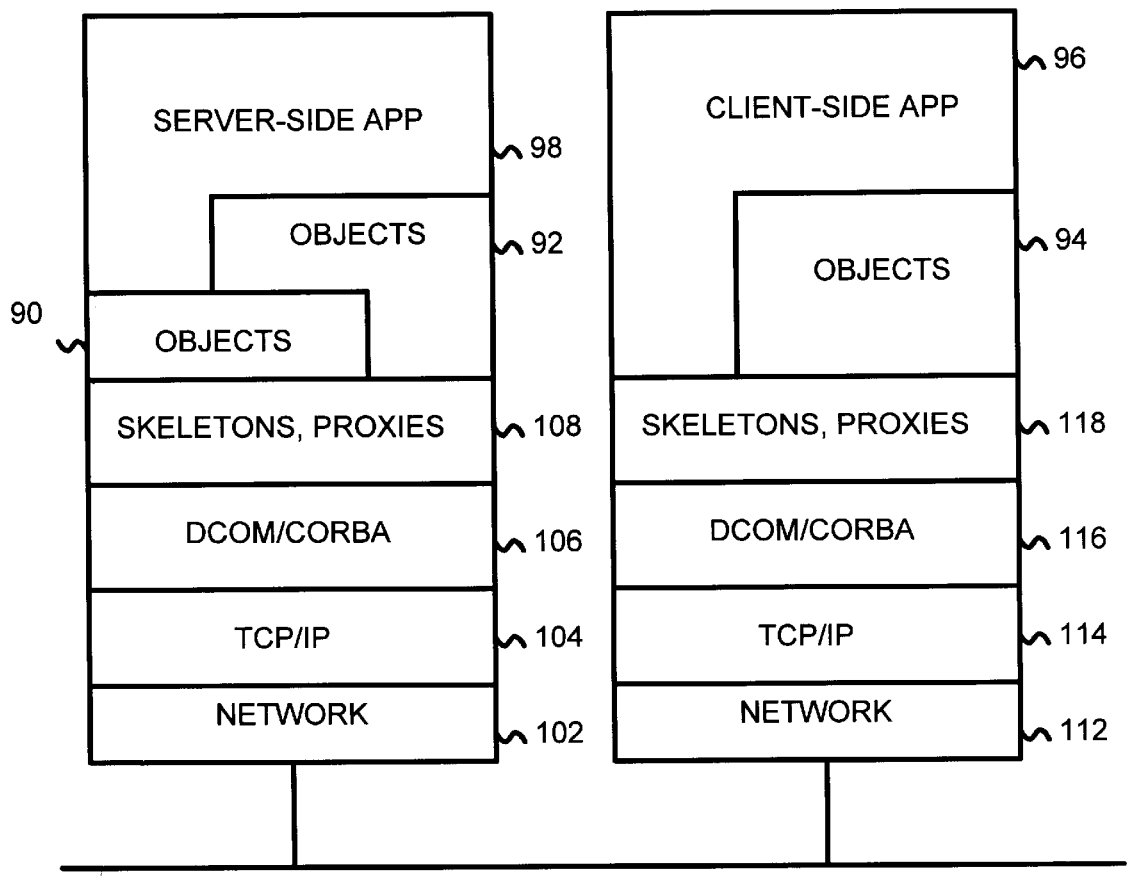
FIG. 3 is a hierarchy diagram of a distributed application.

Basic Distributed-Application Structure—FIG. 3

FIG. 3 is a hierarchy diagram of a distributed application. Server-side application 98 uses class definitions to generate server objects 90, 92. Client side application 96 includes client objects 94.

The details of network communication are hidden from server objects 90, 92 and client objects 94 by skeletons and proxies 108, 118 on the server and client machines. When a client object 94 desires to communicate with a server object 90, a skeleton for the client object is created on the server machine and a proxy for the server object is created on the client machine. The client object 94 communicates with the proxy 118, which acts as an agent for skeleton 108. The skeleton and proxy appear to other objects on the machine to be the client and server objects, so communication with the local skeleton or proxy is straightforward. The skeleton on the server machine communicates with the proxy on the client machine using network protocols similar to remote-procedure calls (RPC's).

Middle-ware layers 106, 116 provide network support functions such as providing high-level addresses or machine names for the stubs and proxies on other machines. Microsoft's Distributed Component Object Model (DCOM) and Object Management Group's Common Object Request Broker Architecture (CORBA) are two competing standards for distributed computing middle-ware. Middle-ware layers 106, 116, and skeletons, proxies 108, 118 hide the details of network communication from other objects in the high-level applications. This allows objects in the application to transparently access remote objects on other machines as though the objects were on the local machine.

Transmission-control protocol/Internet-Protocol TCP/IP layers 104, 114 divide the information into packets, and append internet-protocol (IP) addresses for the source and destination machines. Network layers 102, 112 perform local-area-network routing and low-level error detection, and interface with the physical media of the network.

Figure 4:
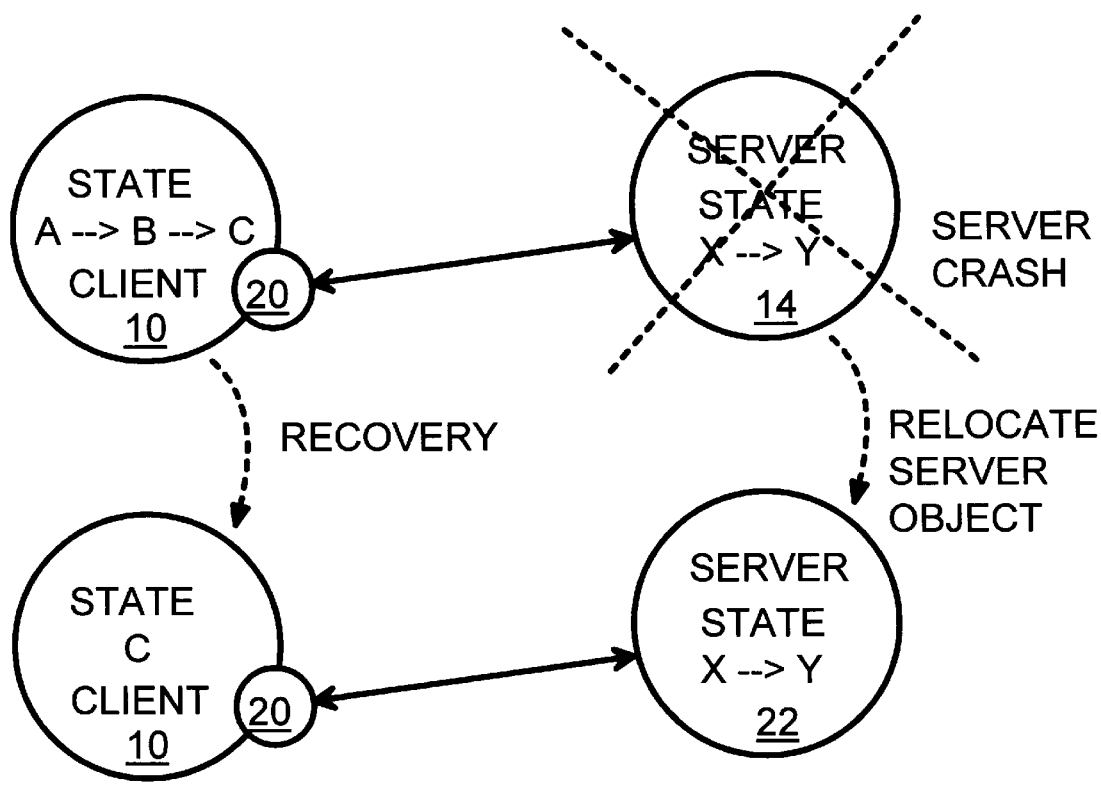
FIG. 4 shows an intelligent proxy recovering from a server crash without re-starting the client object.

Intelligent Proxy—FIG. 4

FIG. 4 shows an intelligent proxy recovering from a server crash without re-starting the client object. A distributed application includes client object 10 running on a client machine, and server object 14 running on a server machine. Proxy 20 is a middleware object that facilitates communication between client object 10 and server object 14, effectively hiding much of the complexity of the network protocols and overhead.

When the server machine or its network connection crashes, client object 10 and proxy 20 are no longer able to communicate with server object 14. Client object 10 has already sequenced from initial state A through state B to state C when the server crashed. Server object 14 likewise has advanced from its initial state X to state Y.

Proxy 20 is an intelligent proxy that stores additional information about server object 14. This additional information stored with intelligent proxy 20 includes the identifying name and the state of server object 14. Using the identifying name, intelligent proxy 20 requests that a new instance of server object 14 be created on a different server machine. Using the stored state of old server object 14, intelligent proxy 20 causes the state of new server object 22 to be advanced from the initial state to the stored state. Thus new server object 22 is advanced from initial state X to state Y, the last state of old server object 14 that crashed.

New server object 22 is therefore in the same state (Y) that old server object 14 was in before the server crash. Since all the details of network communication are handled by proxy 20, new server object 22 appears to be identical to old server object 14, from the perspective of client object 10. Both server objects are in the same state Y. Thus client object 10 can continue making requests to new server object 22.

The state of client object 10 is not lost when the new server object 22 was loaded to replace the crashed server object 14. Client object 10 does not have to be re-loaded or initialized back to initial state A, since new server object 22 is advanced to the old state of crashed server object 14.

Client object 10 is not aware that its server object 14 has crashed, since client object 10 only communicates with proxy 20. Proxy 20 is on the client machine and does not crash when the server machine crashes. Client object 10 may notice that a long period of time has elapsed, since creating new server object 22 and advancing its state may take some time. Ideally, any timeout procedures in client object 10 are disabled or set to longer periods of time to allow sufficient time for proxy 20 to relocate the server object.

Users do not have to repeat whatever steps they had previously performed, and thus do not lose some or all of their work. Users do not have to re-navigated several levels of forms and re-entered information since the client object does not get reset. Thus server crashes no longer crash the client objects.

Information Stored by Intelligent Proxy

Prior-art proxies stored TCP/IP connection and session information about the overall network connection with the server machine. Information about the name and state of the server object is not stored by prior-art proxies.

Intelligent proxy 20 likewise stores connection and session information. However, intelligent proxy 20 also stores the name identifier of the server object and the current state of the server object. The name identifier is used to locate another running instance of that server object, or to request that a new instance be created. The last state of the server object is used to advance the new server object to the last state of the old server object, before the crash.

Other information about the server object is also stored by intelligent proxy 20. Server objects are often nestled in a hierarchy of objects. Although client object 10 may only be communicating with one server object, this server object may need to communicate with other server objects. These other server objects also need to be created on the server machine.

Communication with the server may be secure. Authentication information such as a username and a password are stored with intelligent proxy 20 so that a secure connection with a new server can be established.

Figure 5:
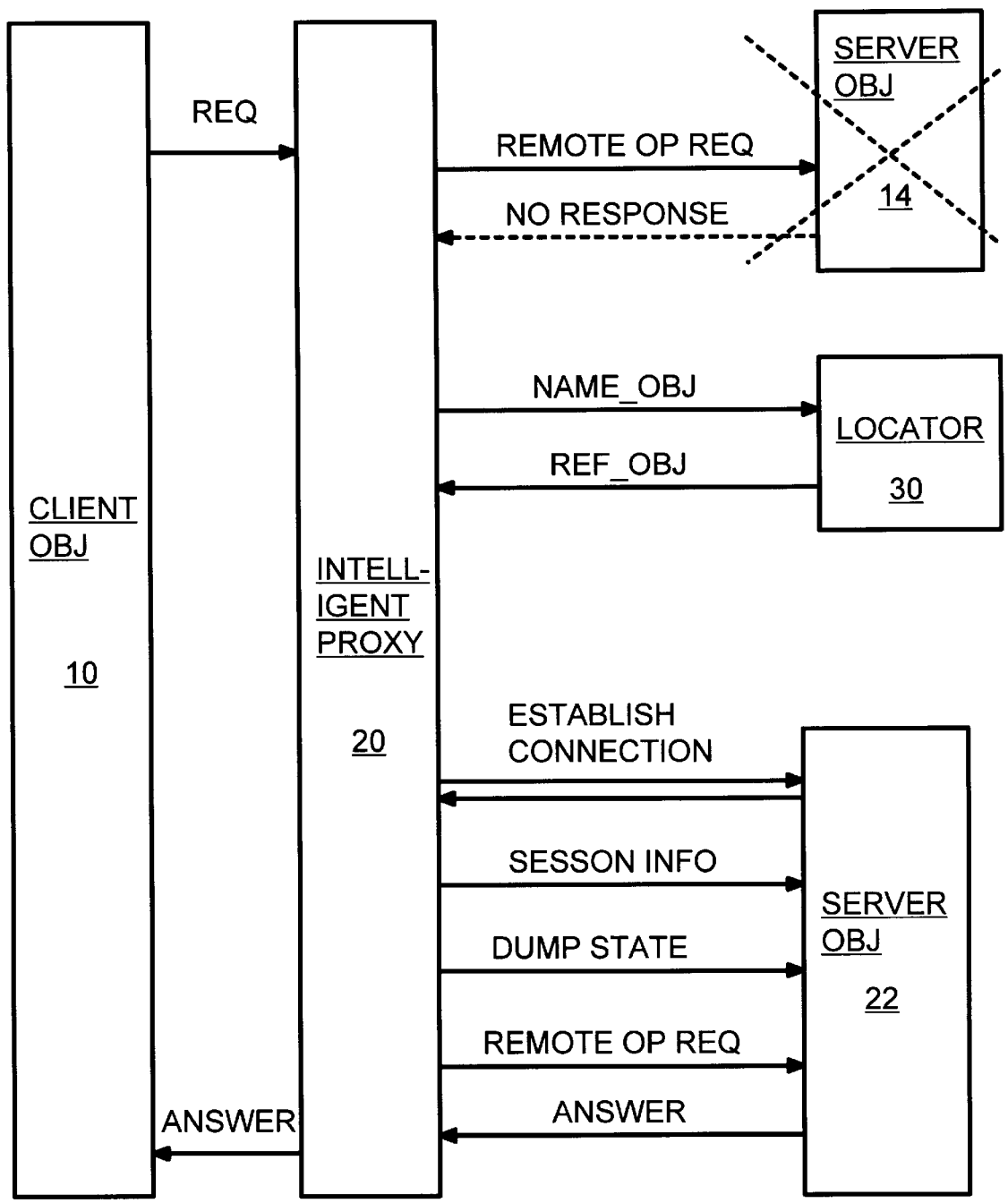
FIG. 5 illustrates a sequence that transparently re-establishes a connection with a new server object using an intelligent proxy.

Sequence to Re-Establish Connection—FIG. 5

FIG. 5 illustrates a sequence that transparently re-establishes a connection with a new server object using an intelligent proxy. The sequence is transparent to client object 10 because intelligent proxy 20 performs the steps that locate a new instance of server object 14 and advance the state of new server object 22 to the last state of the crashed server object 14. Except for a longer than usual response time, client object 10 is not aware that the server has crashed.

Client object 10 sends a request to server object 14 through intelligent proxy 20, which resides on the client machine. Proxy 20 sends a remote operation request over a network to server object 14. However, server object 14 or its server machine has just crashed and does not respond.

After no response from server object 14 has been received for some pre-determined time, a timeout occurs. Intelligent proxy 20 then begins a re-location sequence. The name identifier of server object 14 is read from storage in intelligent proxy 20 and sent to locator 30. Locator 30 is another server that contains a directory of objects. Often another instance of server object 14 is running on a different server machine.

Otherwise, locator 30 creates a new instance of server object 14 on a different server that has not crashed.

A reference to the other running instance or newly-created server object 22 is sent from locator 30 to intelligent proxy 20. Proxy 20 then establishes a new connection with the new server machine, and a session with new server object 22. The old connection and session information is replaced.

The last state of crashed server object 14 is dumped to new server object 22, so that new server object 22 is advanced to the last state seen by client object 10. At this point, new server object 22 is in the same state as was old server object 14 before the server crash. Thus new server object 22 appears to client object 10 to be the same object as old server object 14. The new connection and session information are stored in intelligent proxy 20 and hidden from client object 10.

The remote operation request that was first sent to crashed server object 14 is then sent from intelligent proxy 20 to new server object 22. Server object 22 then processes the request and replies with an answer to proxy 20. Proxy 20 then passes this answer or reply back to client object 10. Client object 10 can then continue processing, without being reset.

The user of client object 10 may notice that a longer than usual delay has occurred before the answer is received, but otherwise the server crash has no visible effect to the user. When the delay is excessively long, intelligent proxy 20 can send a notice to client object 10, such as a "wait . . . processing" notice to display to the user. The user could even be notified that a server relocation is in progress.

Figure 6:
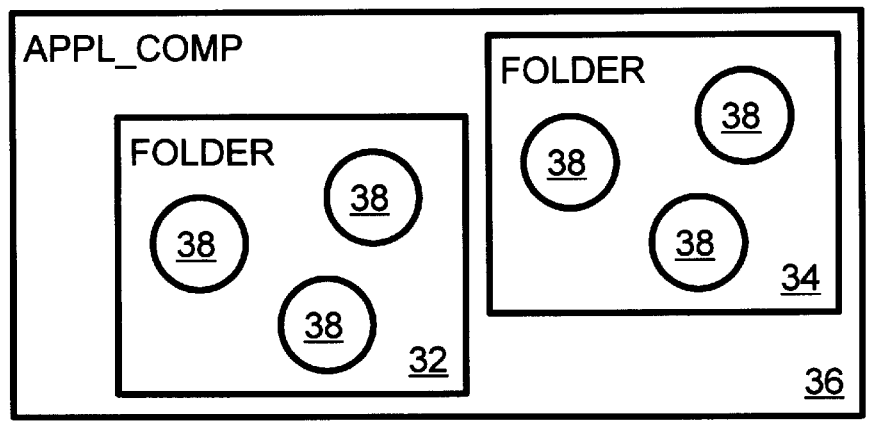
FIG. 6 shows objects arranged in an object hierarchy.

Object Hierarchy—FIG. 6

FIG. 6 shows objects arranged in an object hierarchy. Objects 38 can be client or server objects, or proxies to remote objects on another network node. Objects 38 are grouped into folders 32, 34. Objects 38 within a folder generally have a similar purpose or function. A distributed program contains one or more folders, as shown for application component 36. Other application components can operate together in a larger software application.

Folders are useful for facilitating system management, since individual objects do not have to be separately managed. Arranging objects into functionally-defined folders allows one folder of objects to be loaded when a certain function is called. Other folders with objects performing other functions do not have to be loaded.

Figure 7:
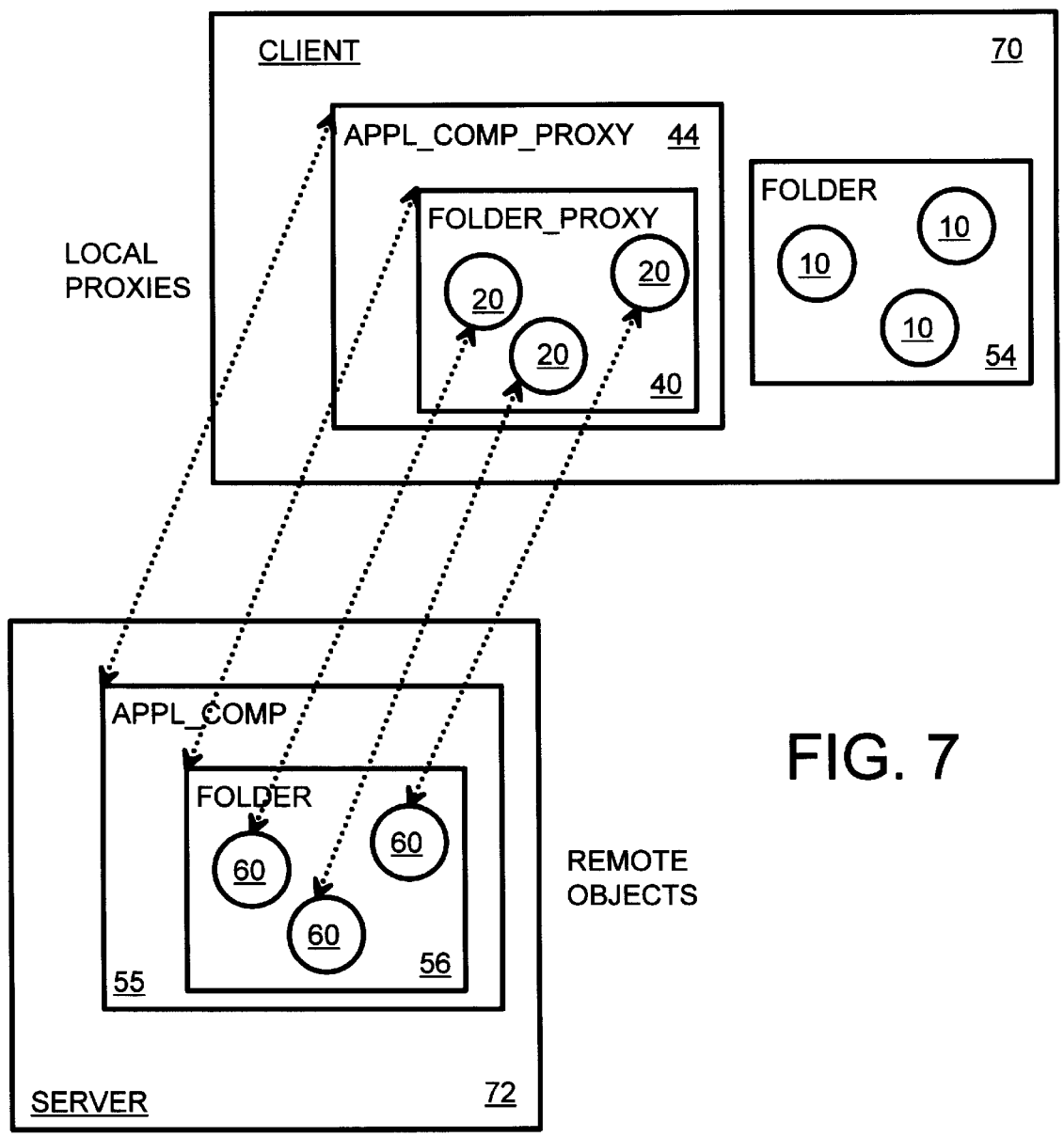
FIG. 7 shows folder proxies and application-component proxies for remote folders and application components.

Folder Proxies and Component Proxies—FIG. 7

The inventor has realized that proxies are useful for remote folders and remote application components as well as for remote objects. FIG. 7 shows folder proxies and application-component proxies for remote folders and application components.

Client 70 contains a local folder 54 of client objects 10. The objects can communicate with remote server objects 60 using local proxies on the client machine. Each remote server object 60 that communicates with client objects 10 has a corresponding proxy 20 on the client. Server objects 60 can also communicate with other server objects (not shown) such as for accessing a server database.

Remote server objects 60 are grouped into folders, such as remote folder 56. Remote folder 56 is part of remote application component 55 on server 72. Server 72 typically contains many other server objects in other folders and other application components (not shown).

Just as each remote server object 60 has a corresponding intelligent proxy 20 on client 70, remote folder 56 also has a folder proxy 40 on client 70. Folder proxy 40 is not merely a grouping of object proxies 20; it is an actual proxy for establishing a remote connection and storing information about the remote folder.

Remote application component 55 on server 72 also has a local application-component proxy 44 on client 70. This application-component proxy 44 is also an intelligent proxy, storing name and hierarchy information that is used after a server crash.

Local object proxies 20, folder proxy 40, and application-component proxy 44 are all intelligent proxies, storing connection, session, name, hierarchy-relationship, and authentication information. State information is also stored for object proxies 20.

Figure 8:
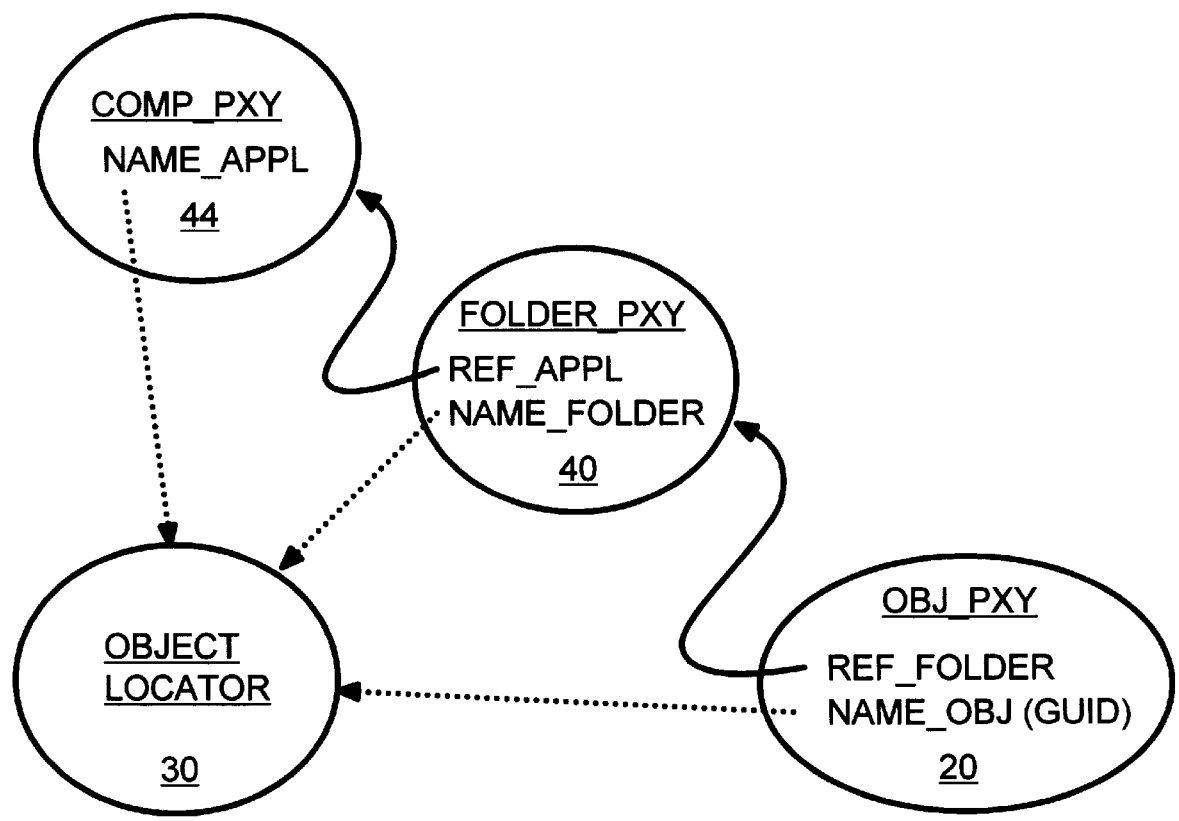
FIG. 8 shows that intelligent proxies for objects, folders, and application-components store hierarchy names and memory references for locating other objects in a hierarchy after a server crash.

Object, Folder, and Component Proxies Store Hierarchy Names—FIG. 8

FIG. 8 shows that intelligent proxies for objects, folders, and application-components store hierarchy names and memory references for locating other objects in a hierarchy after a server crash. Intelligent proxy 20 for a server object contains the name identifier of the server object that has just crashed. This name identifier can be the globally-unique ID (GUID) of the crashed server object. After a server crash, the name identifier from object proxy 20 is sent to locator 30, which looks up the name identifier to find another instance of the crashed server object. Locator 30 can look up the class of the crashed server object and create another server object from the same class, and with the same properties or parameters.

Object class definitions are stored in one or more folders on the server. This folder reference REF_FOLDER is a memory reference or pointer to the folder's intelligent proxy on the client.

Using the folder reference REF_FOLDER from object proxy 20, the folder's intelligent proxy 40 can be located. Folder proxy 40 stores the name of the folder, NAME_FOLDER, that is sent to locator 30. Locator 30 uses the folder name to find another running instance of the folder on another server, or to load another instance of the folder.

Folder proxy 40 also contains hierarchy information. Folder proxy 40 stores a reference or pointer to application-component proxy 44 that is on the client machine.

Using this pointer, folder proxy 40 can find its application-component proxy, the higher level of the hierarchy. Application-component proxy 44 stores the name of the application component on the server, NAME_APPL. This application-component name is sent to locator 30 to find another running instance of the server's application component, or to load another instance.

Storing hierarchy information in the intelligent proxies allows only part of the distributed application to be loaded when recovering from a server crash. This speeds up recovery, since only the needed objects are loaded onto another server, allowing the client object to resume processing sooner than if all server objects were first restored.

Using separate intelligent proxies for each level of the hierarchy provides an efficient recovery mechanism. The hierarchy can be traversed as crashed objects are re-loaded, bypassing server objects that are not in use.

Procedure for Restoring Objects, Folders, Components—FIGS. 9A–9D

Figure 9A:
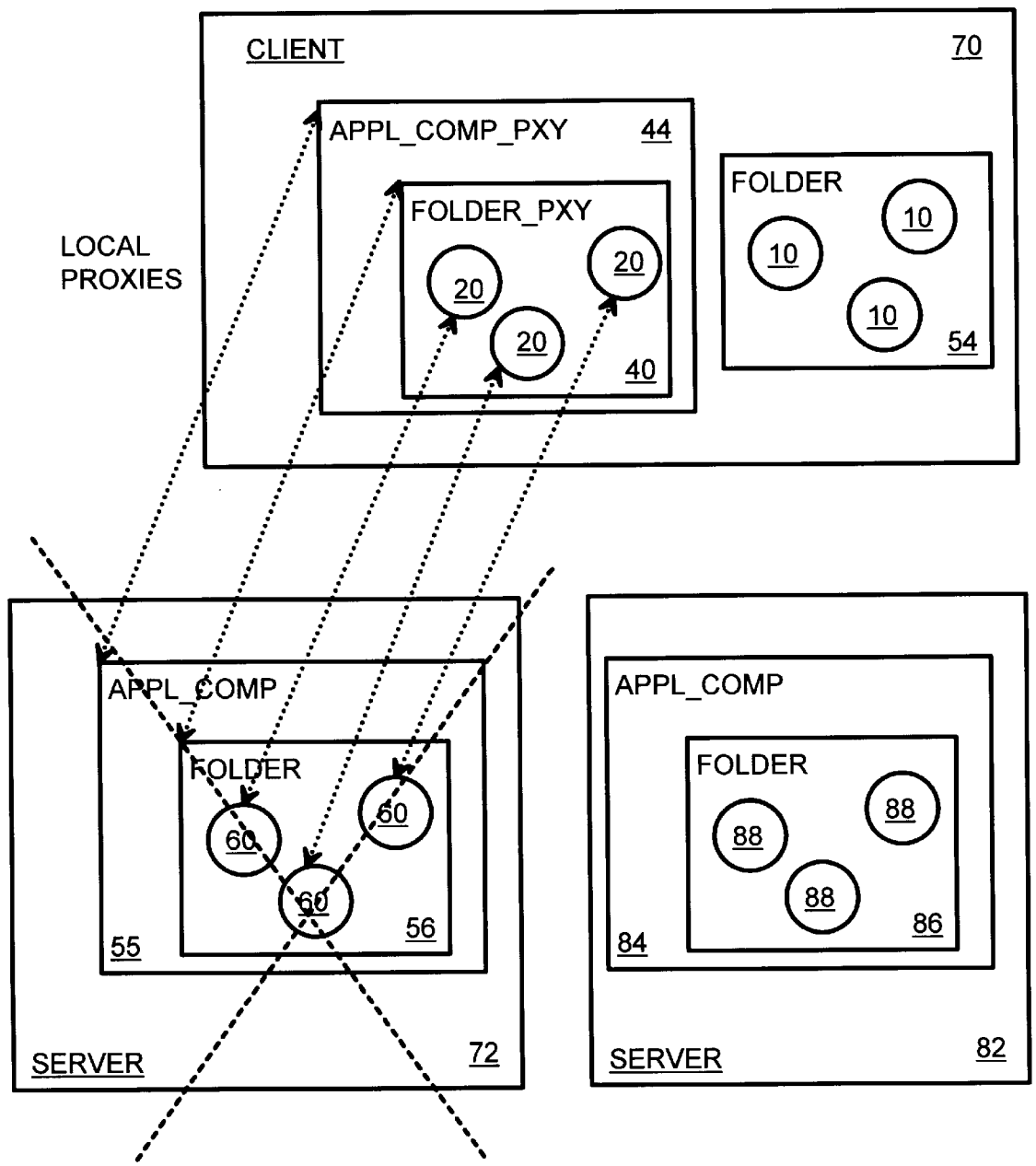
FIGS. 9A–9D show an example of using intelligent proxies to re-locate objects, folders, and application components to another server after a server crash.

FIGS. 9A–9D show an example of using intelligent proxies to re-locate objects, folders, and application components to another server after a server crash. In FIG. 9A, client objects 10 in folder 54 on client 70 are communicating with server objects 60 on server 72. Client 70 includes object proxies 20 in folder proxy 40, which is within application-component proxy 44. These are proxies for server objects 60, remote folder 56, and remote application component 55 on server 72.

When server 72 crashes, all of its server objects 60 become unavailable. Remote folder 56 and remote application component 55 also do not respond to folder proxy 40 and application-component proxy 44. All of the proxies' references to server 72 become invalid.

The server crash is usually noticed first by an object proxy when a remote operation is requested by a client object. The object proxy executes a recovery routine that first calls a recovery routine for the folder. The folder's recovery routine itself first calls the recovery routine for the application component. Thus control is passed up to the top level of the hierarchy during recovery. Pseudo-code for these recovery routines is described in more detail in the next section.

Figure 9B:
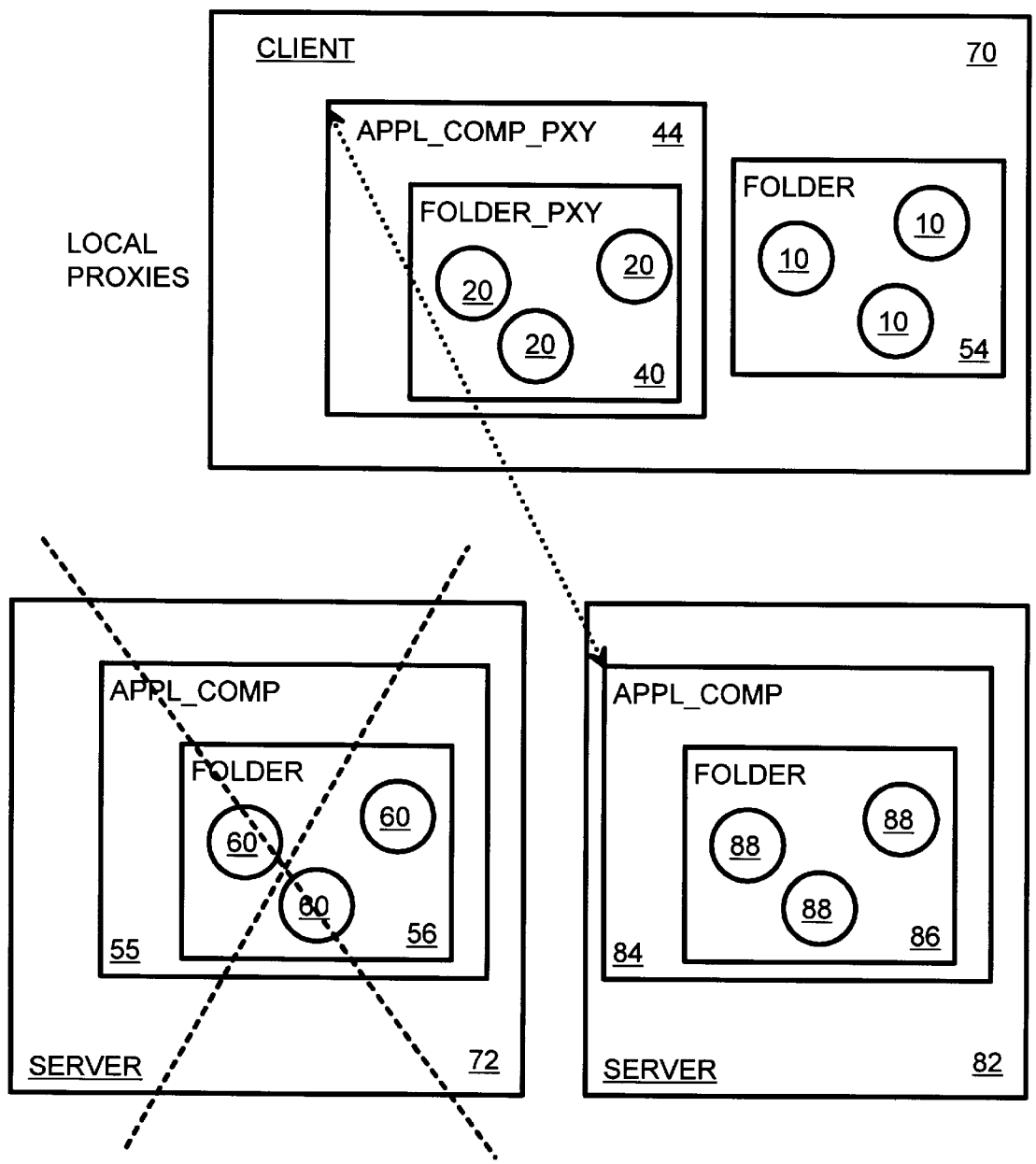

In FIG. 9B, the recovery routine in the application-component proxy sends the name of the application component on the crashed server to the locator. The locator returns a pointer or reference to another instance of the named application component, new application component 84, creating a new instance if necessary. This reference is used by application-component proxy 44 to establish a connection over the network to another server 82 and to create a session with application component 84 on server 82. The username and password may be sent from application-component proxy 44 on client 70 to server 82 for authentication of a secure connection.

Figure 9C:
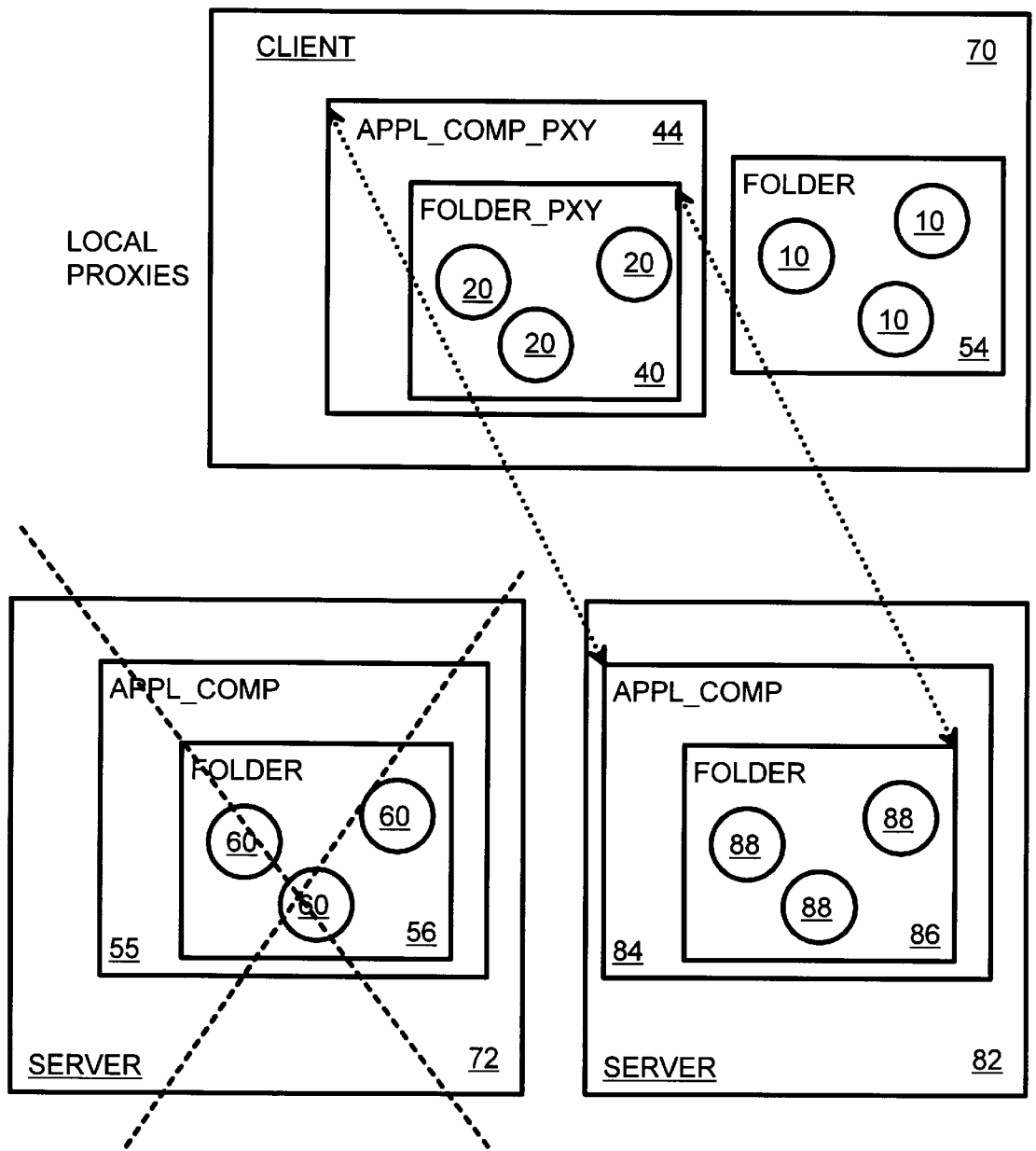

In FIG. 9C, control is passed back down to the recovery routine in folder proxy 40. Folder proxy 40 then sends the folder name it stored to the locator, which returns a reference to new folder 86 on server 82. A session and a connection are created between folder proxy 40 and new folder 86 on server 82 using this reference.

Figure 9D:
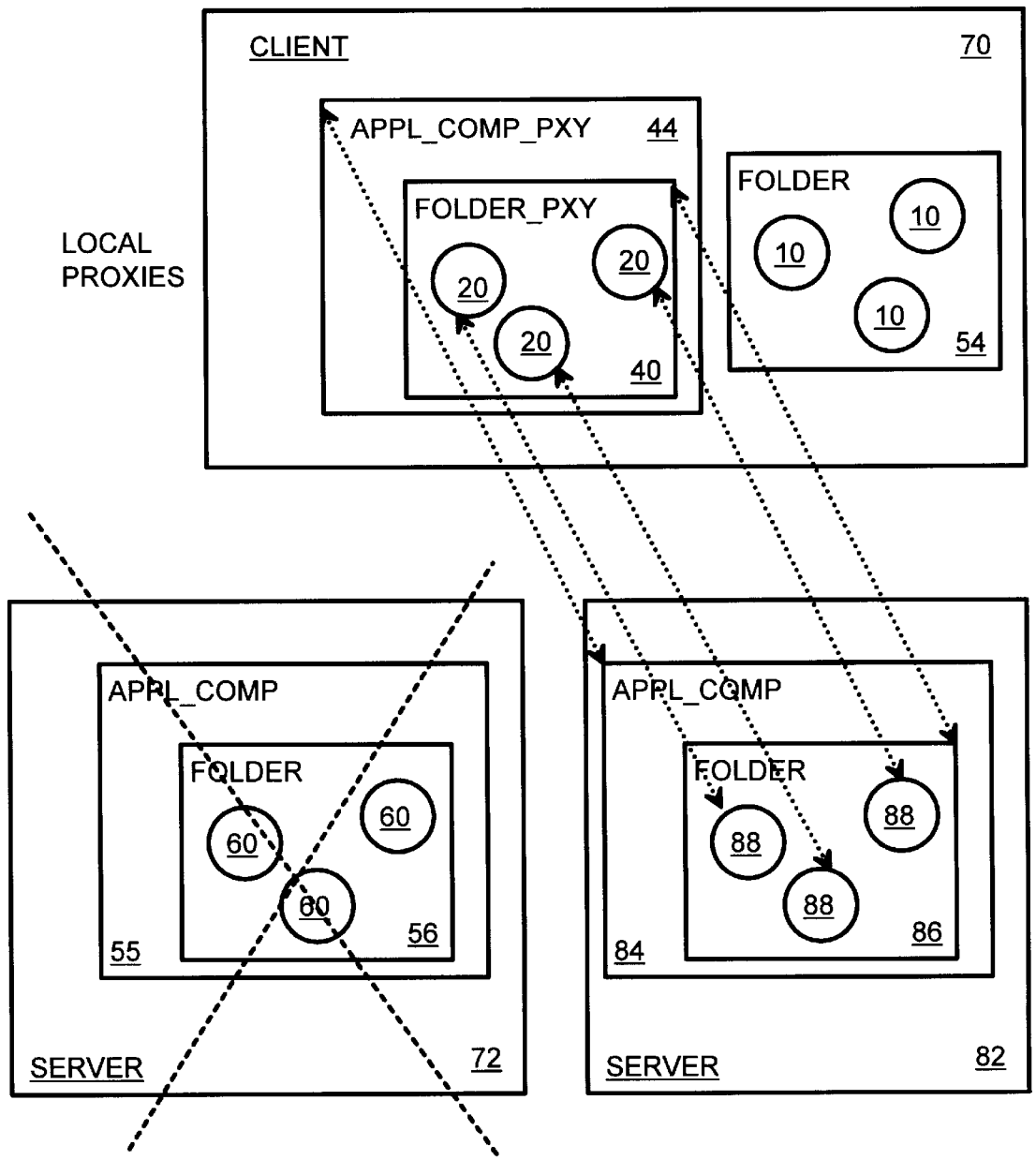

Finally, in FIG. 9D control is passed back down to object proxy 20. The recovery routine in object proxy 20 then sends the server-object identifier it stored to the locator, which returns a reference to new server object 88 on server 82. A session and a connection are created between object proxy 20 and new server object 88 on server 82 using this reference.

Other server objects 88 can be loaded when new folder 86 is recovered, or they can wait until one of the client objects 10 requests an operation from them. Processing latency is improved when only the requested server objects are recovered, allowing the requesting client object to resume processing sooner.

Thus the crash of server 72 is transparent to client objects 10. The various levels of the hierarchy are recovered in an orderly fashion to another server 82. Intelligent proxies 20 use their recovery routines to call recovery routines for other levels of the hierarchy.

Pseudo Code for Recovery By Intelligent Proxies

The server crash is usually noticed first by an object proxy when a remote operation is requested by a client object. The object proxy includes the following pseudo-code to request a remote operation:

```
ObjectRef: :RemoteOp ()
{
        try
        {
                execute a remote operation
        }
        catch (remote operation failure)
        {
                // on error, starts the recovery sequence
                recover();
        }
}
```

When the remote operation fails or times out, the catch function starts the error recover sequence by executing the object's recovery routine:

```
ObjectRef: : recover ()
{
        // recover the parent folder first
        m_folderRef.recover();
        // refresh the object reference through the locator
        m_objectRef = Locator.lookup(m_objectID);
        if exists additional recovery procedure(s)
                perform the recovery procedures, e.g. SaveState()
}
```

The second function called by the recovery routine sends the object's name identifier "m_objectID" to the locator, which returns a reference to a new server object. The stored state of the server object is then dumped to the newly-created server object by the SaveState command.

However, before the server object is recovered, higher levels in the hierarchy are first recovered. Thus the first statement in the above object-recovery routine calls the recovery routine of the folder containing the object:

```
FolderRef: :recover ()
{
    // recover the application component
    m_appcomp.recover ();
    // refresh the folder reference
    m_folderRef = Locator.lookup(m_folderName);
    if exists additional recovery procedure(s)
        perform the recovery procedures
}
```

Again, the folder is recovered by sending the folder name "m_folderName" to the locator, which refreshes the folder reference to another server. But first the higher-level application component is recovered by calling its recovery routine:

```
AppCompRef: :recover ()
{
    // look up the application component through the locator
    m_appcompRef = Locator.lookup(m_appCompName);
    // authenticate again. . .
    reauthenticate ();
    if exists additional recovery procedure(s)
        perform the recovery procedures
}
```

Since the application component is the highest level of the hierarchy, its recovery routine simply sends the name of the application component ("m_appCompName") to the locator, which returns the reference or pointer ("m_acompRef") to the new application component on the new server.

The re-authenticate function uses the username and password stored in the application component proxy to authenticate a new secure connection to the new server. Control is then returned to the folder's recovery routine, which sends the folder name to the locator to get the new folder reference, and then to the object's recovery routine which sends the object name to the locator to get the new object reference.

Any additional user-defined recovery routines can be executed for each level of the hierarchy. Finally, the last state of the crashed server object is dumped or saved to the new server object.

ADVANTAGES OF THE INVENTION

The state of the client object is not lost when the new server object is loaded to replace the crashed server object. The client object does not have to be re-loaded or initialized back to its initial state, since the new server object is advanced to the old state of crashed server object.

Users do not have to repeat whatever steps they had previously performed, and thus do not lose some or all of their work. Users do not have to re-navigated several levels of forms and re-entered information since the client object does not get reset. Thus server crashes no longer crash the client objects.

The user of a client object may notice that a longer than usual delay has occurred before the answer is received, but otherwise the server crash has no visible effect to the user. When the delay is excessively long, the intelligent proxy can send a notice to the client object, such as a "wait . . . processing" notice to display to the user.

Storing hierarchy information in the intelligent proxies allows only part of the distributed application to be loaded when recovering from a server crash. This speeds up recovery, since only the needed objects are loaded onto another server, allowing the client object to resume processing sooner than if all server objects were first restored.

Using separate intelligent proxies for each level of the hierarchy provides an efficient recovery mechanism. The hierarchy can be traversed as crashed objects are re-loaded, bypassing server objects that are not in use. Thus the crash of a server is transparent to the client objects. The various levels of the hierarchy are recovered in an orderly fashion to another server. Intelligent proxies use their recovery routines to call recovery routines for other levels of the hierarchy.

The use of intelligent proxies hides all the details of the recovery mechanisms from application developers, so they don't need to be concerned about writing specific code to perform recovery.

ALTERNATE EMBODIMENTS

Several other embodiments are contemplated by the inventors. While one server and multiple clients have been described, the server may itself span multiple machines. One server machine may serve the application component to the clients, while another server accesses the saved objects for the primary server. Redundant or geographically remote servers can also be employed. Caches can be employed. Personal computers, network computers (NC's), and other platforms may be used. The invention can be applied to multi-tiered applications rather than just two-tiered client-server applications.

Different protocols compliant with DCOM or CORBA can be used, and different network middle-ware such as DCOM or CORBA can be used. Sometimes only some of the software on a server machine has crashed, while other programs or objects are still running. The invention also applies to these software crashes The client usually contacts the locator for references of remote objects, but a cache of the memory references of other running instances of the server object could be stored with the intelligent proxy to speed up the location process. An exponential backoff algorithm can be used for recovery.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A transparently-recoverable distributed-object application for hiding server failures from clients comprising:

a client object running on a client machine on a network;

a first server object on a first server machine on the network;

wherein the client object is not reloaded or restarted when the first server object fails, the client object continuing its operation with a second server object when the first server object fails;

an intelligent proxy running on the client machine, the client object communicating with the intelligent proxy when sending a request over the network to a remote object, the intelligent proxy further comprising:

timeout means for determining when a request sent from the intelligent proxy to the first server object has not been responded to in a predetermined time;

storage means for storing a name-identifier for the first server object;

locator means, coupled to receive the name-identifier from the intelligent proxy, for generating a pointer to the second server object also being identified by the name-identifier from the intelligent proxy; and new connection means, receiving the pointer from the locator means, for establishing a new connection between the intelligent proxy and a second server and for establishing a new session with the second server object on the second server;

state-sending means, coupled to the new connection means, for sending a last state of the first server object to the second server object;

state means, coupled to the second server object, for advancing the second server object in state to the last state received from the state-sending means, whereby the intelligent proxy establishes the new connection to the second server when the first server object does not respond, whereby the new connection is transparent to the client object and the second server object is advanced to the last state of the first server object.

2. The transparently-recoverable distributed-object application of claim 1 wherein:

the storage means in the intelligent proxy also stores the last state of the first server object.

3. The transparently-recoverable distributed-object application of claim 2 wherein the storage means in the intelligent proxy further stores hierarchy information to indicate a hierarchy of objects in the distributed-object application that includes the first server object.

4. The transparently-recoverable distributed-object application of claim 3 wherein the intelligent proxy is a proxy for an object and wherein the hierarchy information stored in the intelligent proxy includes a folder proxy of a higher-level folder of objects in the hierarchy.

5. The transparently-recoverable distributed-object application of claim 4 further comprising:

a folder proxy on the client machine, the folder proxy for communicating with a server folder of server objects on the first server machine;

wherein the folder proxy stores a folder name, the folder name sent to the locator means which returns a folder reference to a second folder on the second server, wherein the folder proxy is a proxy for a higher-level folder of server objects.

6. The transparently-recoverable distributed-object application of claim 5 further comprising:

an application-component proxy on the client machine, the application-component proxy for communicating with a server application-component on the first server machine;

wherein the application-component proxy stores an application-component name, the application-component name sent to the locator means which returns an application-component reference to a second application-component on the second server;

wherein the application-component proxy is a proxy for a higher-level application-component having folders of server objects.

7. The transparently-recoverable distributed-object application of claim 6 wherein:

the intelligent proxy for the first server object further stores a folder-proxy reference to the folder proxy; and the folder proxy further stores a component-proxy reference to the application-component proxy, whereby a hierarchy of proxies stores hierarchy information for the first server object.

8. The transparently-recoverable distributed-object application of claim 6 wherein the application-component proxy further stores authentication information including a password for establishing a secure connection with the second server.

9. The transparently-recoverable distributed-object application of claim 6 wherein the first server machine has crashed.

10. A computer-implemented method for transparently recovering from a server crash without re-initializing a client object, the computer-implemented method comprising the steps of:

generating a remote request for a server object;

sending the remote request from the client object to an intelligent proxy;

transmitting the remote request over a network from the intelligent proxy to the server object a first server machine;

detecting that no response has been received from the first server machine;

sending a name-identifier for the server object from the intelligent proxy to a locator;

receiving a memory-reference from the locator, the memory-reference pointing to a second server having a second server object, the second server object and the server object both having the name-identifier;

replacing connection and session information for the server object stored with the intelligent proxy with connection and session information for the second server object to set a state of the second server object to a last state of the server object;

establishing a connection from the intelligent proxy to the second server;

creating a session from the intelligent proxy to the second server object on the second server;

re-transmitting the remote request over the network from the intelligent proxy to the second server object the second server machine; and receiving a reply to the remote request from the second server object and sending the reply from the intelligent proxy to the client object, whereby the intelligent proxy replaces the server object on the first server machine with the second server object on the second server so that the client object is not aware that the first server machine has stopped responding.

11. The computer-implemented method of claim 10 further comprising:

placing the second server object in a same state as a last state of the server object before the first server machine stopped responding, whereby the second server is in the same state before the remote request is re-transmitted from the intelligent proxy.

12. The computer-implemented method of claim 10 further comprising:

storing the last state of the server object for the intelligent proxy;

transmitting the last state of the server object from the intelligent proxy to the second server object, whereby the last state of the server object is stored for the intelligent proxy to advance the state of the second server object.

13. The computer-implemented method of claim 10 wherein the intelligent proxy is on a same client machine as the client object.

14. The computer-implemented method of claim 10 further comprising reading a folder-proxy reference in the intelligent proxy;

using the folder-proxy reference to find a folder proxy for a remote folder;

reading a component-proxy reference in the folder proxy;

using the component-proxy reference to find a component proxy for a remote component;

reading a component name from the component proxy;

sending the component name for an application component including the server object from the component proxy to the locator;

receiving a remote-component reference from the locator, the remote-component reference pointing to the second server having another instance of the application component;

reading a folder name from the folder proxy;

sending the folder name for a folder including the server object from the folder proxy to the locator; and receiving a remote-folder reference from the locator, the remote-folder reference pointing to the second server having another instance of the folder, whereby the folder proxy and the component proxy are used to recover levels of hierarchy above the server object.

15. The computer-implemented method of claim 14 wherein the intelligent proxy, the folder proxy, and the component proxy are all proxy objects on a client machine.

16. A computer-program product comprising:

a computer-usable medium having computer-readable program code means embodied therein for transparently recovering a distributed application, the computer-readable program code means in the computer-program product comprising:

network connection means for transmitting and receiving packets from clients to a server;

client objects for displaying information to a user;

object proxies for sending requests from the client objects to remote server objects;

object-proxy storage for storing:

connection and session information about a connection to a server machine;

a name-identifier of a crashed server object on the server machine;

a last state of the crashed server object;

crash-detect means for detecting when the crashed server object is no longer responding;

a re-locator, responsive to the crash-detect means and receiving the name-identifier, for generating a replacement pointer to a replacement server object belonging to a same class of objects indicated by the name-identifier of the crashed server object;

new-connection means for using the replacement pointer to establish a new connection and session to the replacement server object; and state-dumping means for dumping the last state of the crashed server object to the replacement server object, whereby the object proxies re-locate from the crashed server object to the replacement server object transparently to the client objects and the replacement server object is advanced to the last state of the crashed server object.

17. The computer-program product of claim 16 wherein the computer-readable program code means further comprises:

folder proxies on the clients for representing folders of server objects, the object proxies storing references to folder proxies containing the crashed server object represented by the object proxy.

18. The computer-program product of claim 17 wherein the computer-readable program code means further comprises:

component proxies on the clients for representing components of folders of server objects.

* * * * *